Jan. 21, 1936.  W. C. GUIER ET AL  2,028,701
OIL FIELD SKID WINCH
Filed June 28, 1934  2 Sheets-Sheet 1

Inventors
William C. Guier
& Gerald G. Brown
By
Bacon & Thomas
Attorneys

Jan. 21, 1936. W. C. GUIER ET AL 2,028,701
OIL FIELD SKID WINCH
Filed June 28, 1934 2 Sheets-Sheet 2

Inventors
William C. Guier
and Gerald G. Brown

By Bacon & Thomas
Attorneys

Patented Jan. 21, 1936

2,028,701

UNITED STATES PATENT OFFICE 2,028,701

OIL FIELD SKID WINCH

William C. Guier and Gerald G. Brown, Wichita, Kans., assignors to The All Steel Products Manufacturing Company, Wichita, Kans., a corporation of Kansas Application June 28, 1934, Serial No. 732,940

9 Claims. (Cl. 254—187)

This invention relates to new and useful improvements in oil field skid winches.

The primary object of the invention is to provide a winch assembly which is mounted on skid bars adapted for supporting the assembly for movement over the ground, or the like, and wherein the various elements of the assembly are compactly associated with each other to provide a unit of relatively small over-all dimensions.

A further object of the invention is to provide an oil field skid winch which includes a power plant unit and a winch drum mounted upon skid bars and provided with a compact driving mechanism.

Still another object of the invention is to provide a power plant unit including a prime mover and a variable speed transmission adapted for driving a winch drum through sprocket and chain connections with novel means for supporting the power output end of the power unit in such a manner as to protect the transmission portion of the power plant unit against side pull produced by the chain drive.

Still another object of the invention is to provide a novel form of power output and supporting attachment for the free end of the transmission unit.

Figure 1:
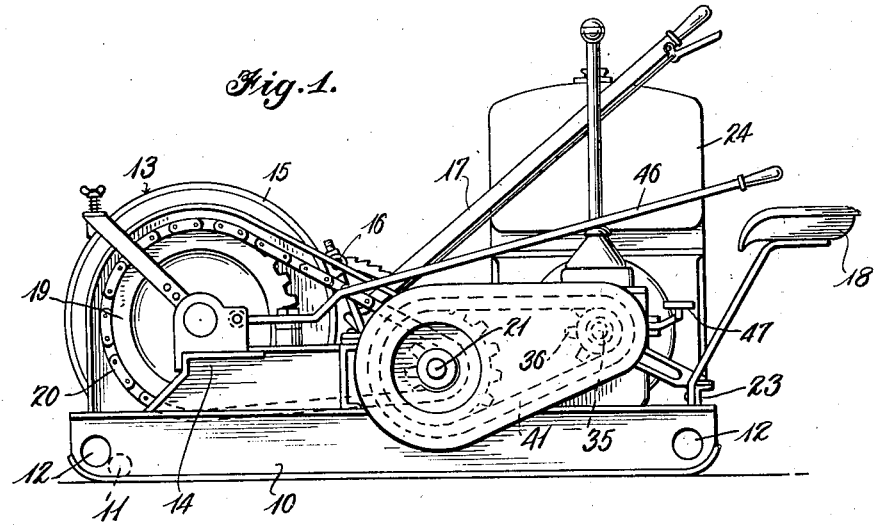
Figure 2:
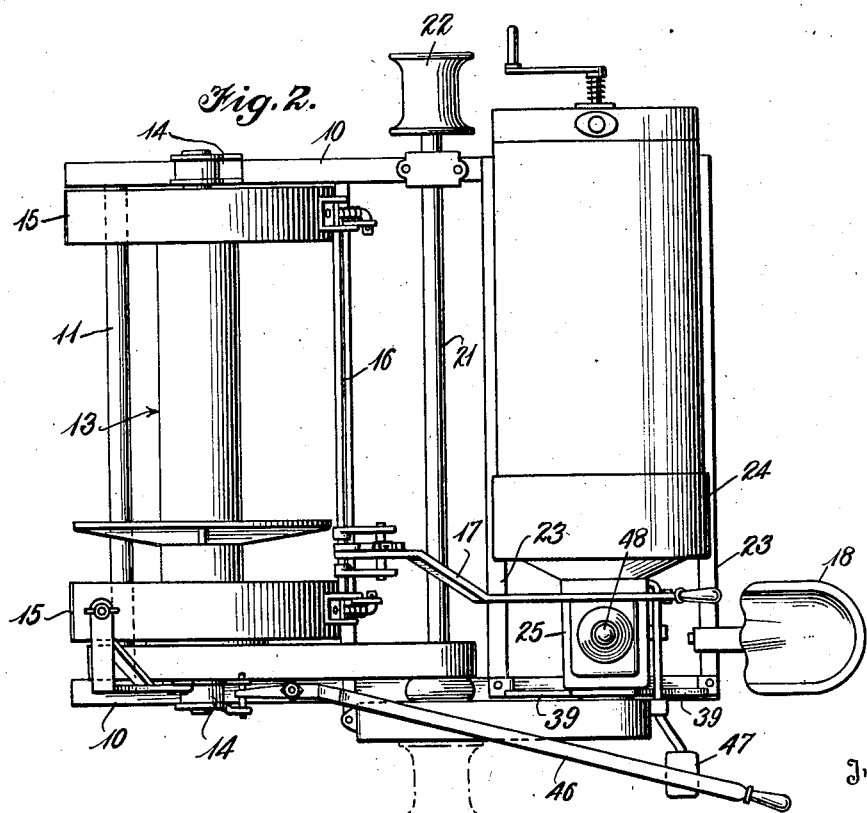
Figure 3:
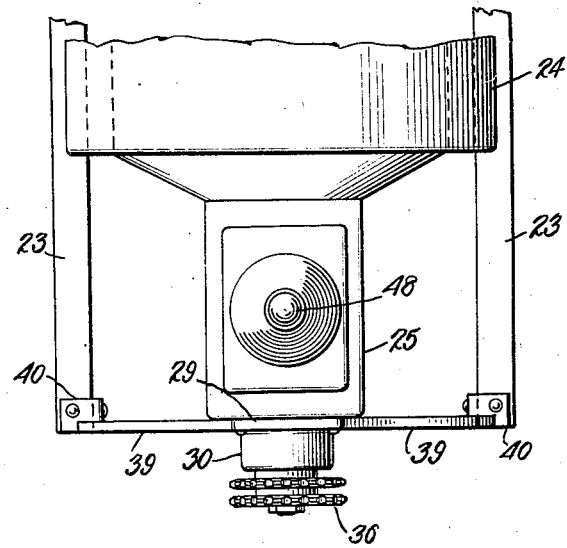
Figure 5:
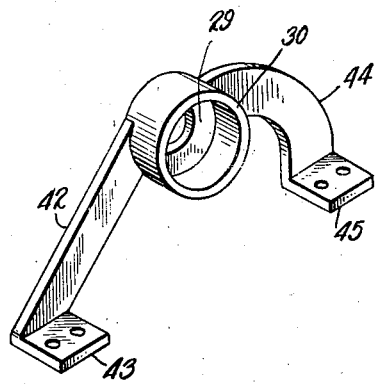
Figure 4:
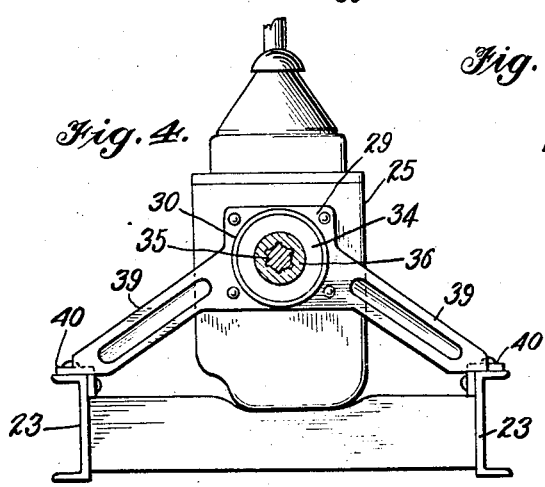
Figure 6:
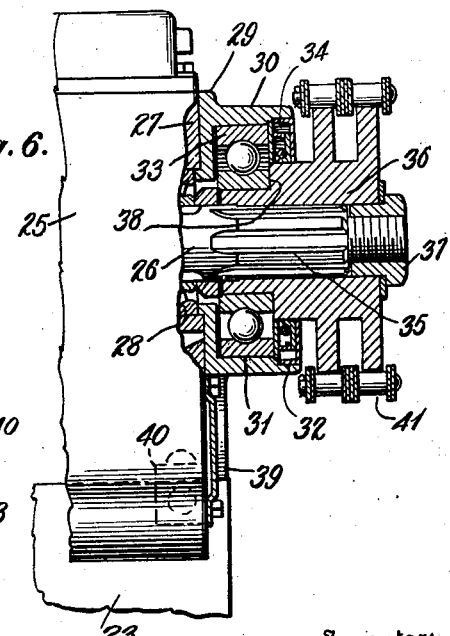

Other objects and advantages of the invention will be apparent during the course of the following description:

In the accompanying drawings forming a part of this specification and in which like numerals are employed to designate like parts throughout the same, Figure 1 is a side elevation view of the oil field skid winch embodying this invention, Figure 2 is a top plan view of the structure shown in Figure 1, Figure 3 is a fragmentary top plan view of the power plant unit and discloses one form of supporting and power output attachment for the transmission portion of the power plant unit, Figure 4 is a detail end elevational view of the unit shown in Figure 3, Figure 5 is a detail perspective view disclosing a slightly modified form of supporting and power output attachment for a transmission of the power plant unit, and Figure 6 is a fragmentary vertical sectional view disclosing the details of the supporting and power output attachment for the variable speed transmission of the power plant unit.

Referring first to Figures 1 and 2, it will be seen that the oil field skid winch assembly embodying this invention includes two parallel skid bars 10 which are held in spaced parallelism by means of transverse bracing members 11. One of these transverse bracing members is arranged at each end of the skid bars 10. The extremities of these bars are provided with apertures 12 adapted for use in moving the skid winch over the ground by having connected thereto suitable cables.

A winch drum assembly 13 is mounted on the skid bars 10 by means of a bearing bracket 14 and is arranged so that the axis of rotation of the drum extends transversely of or cross-wise of the skid bars 10. The winch drum assembly includes frictional brake devices 15 which are interconnected by a transversely extending control rod 16. This rod is actuated by a control lever 17 which terminates in a convenient position with respect to the operator's seat 18. Figure 2 discloses this seat as being arranged at one end of the entire assembly and adjacent one side thereof and is suitably attached to a portion of the framework of the winch, as clearly illustrated in Figure 2.

The winch drum is provided with a sprocket wheel 19 at one end thereof and over which is trained a sprocket chain 20. This sprocket chain connects the drum to a countershaft 21 which is supported by suitable bearings upon the skid bars 10 and is arranged in parallelism with the axis of the winch drum. Figure 2 discloses a standard cathead 22 as being mounted upon one end of the transverse countershaft 21.

Figures 2 to 4, inclusive, disclose parallel beams 23 which are mounted on and connected to the skid bars 10 to extend crosswise thereof and adjacent one end of the entire assembly. These parallel beams 23 are adapted for supporting a power plant unit which includes a prime mover 24 and a variable speed transmission gear unit 25. The prime mover 24 may take the form of an internal combustion engine or any other type of motor. The prime mover and the transmission unit are illustrated as being connected in end-to-end relation. The prime mover portion 24 of the unit may be supported in any desired manner upon the beams 23. A special form of power output and supporting attachment is provided for the free end of the variable speed transmission unit 25. This special attachment will be described in connection with Figures 3 to 6, inclusive.

In Figure 6 there is disclosed a fragmentary portion of the variable speed transmission unit 25. This unit includes a driven shaft 26 which is supported in the end wall 27 of the transmission 25 by means of an anti-friction bearing unit 28. The driven shaft 26 of the transmission projects outwardly of the transmission casing in the usual manner. The attachment comprises a securing flange 29 which is bolted in any desired manner to the outer face of the end wall 27 of the transmission. The mounting flange 29 has formed integral therewith a tubular casing extension 30. This casing extension is arranged concentric with the axis of the driven shaft 26 and has its inner surface stepped to provide two concentric portions 31 and 32. The portion 31 receives an anti-friction bearing unit 33 while the portion 32 of the casing extension receives a conventional sealing unit 34.

The projecting end of the driven shaft 26 of the transmission is splined at 35 for the reception of the hub portion 36 of a sprocket wheel. This sprocket wheel is retained in place on the splined end 35 of the shaft 26 by means of a nut 37 which is threaded on the extremity of the shaft. The hub portion furthermore is reduced in diameter at its inner end to provide a shoulder 38 which functions to retain the anti-friction bearing assembly 33 in place within the casing extension 30. It will be noted that this anti-friction bearing unit supports the projecting end of the shaft 26 and the sprocket exteriorly of the transmission unit.

The mounting flange 29 of this power output attachment is disclosed in Figures 3 and 4 as having formed integral therewith downwardly diverging legs 39. The extremities of these legs are flanged at 40 for connection with the parallel bars 23, previously referred to. It will be noted that these legs 39 extend transversely of the longitudinal axis of the variable speed transmission unit 25 and in the direction of pull of the chain 41 which is trained over the sprocket wheel 36. These legs 39, therefore, protect the power output end of the transmission unit against side pull produced by the chain 41. It is understood that this chain extends to a sprocket wheel mounted upon the transverse countershaft 21. The drive for this countershaft and the winch drum, therefore, is provided by the sprocket wheel 36 and the sprocket chain 41.

In Figures 5 there is disclosed a slightly modified form of supporting and power output attachment. This attachment consists of the same form of mounting flange 29, as disclosed in Figures 3, 4 and 6, and has attached thereto a casing extension 30 of the same design as that disclosed in detail in Figure 6. This attachment differs from the attachment previously described by having one straight, inclined leg 42 which is adapted to project laterally of the transmission in the same direction as that taken by the sprocket chain 41. This leg 42 has a mounting flange 43 at its extremity. A downwardly curved leg 44 is provided for the other side of the attachment. This leg has formed on its extremity a mounting flange 45. The mounting flanges 43 and 45 are adapted to be connected to the parallel beams 23 in the same general manner as the mounting flanges 40 of the legs 39 in the first described attachment. The curved leg 44 is provided for the purpose of permitting access to be had to the end bearing of the reverse gear countershaft of the transmission unit 25.

The winch drum 13 and its sprocket wheel 19 are adapted to be interconnected by a clutch structure, not shown in detail, which is controlled by a lever 46 terminating at a convenient position with respect to the operator's seat 18. The prime mover 24 and the transmission unit 25 are of conventional design and have interposed between the same a clutch assembly of conventional form. The details of this clutch assembly have not beeen illustrated. This clutch assembly, however, is controlled by a pedal 47 which is arranged in a convenient position with respect to the operator's seat 18. The transmission also is provided with a gear shift lever 48. By means of the control levers 17, 46, 47 and 48, an operator positioned upon the seat 18 is capable of completely controlling the direction and speed of drive of the winch drum 13.

It is to be understood that the forms of the invention herewith shown and described are to be taken as preferred examples of the same, and that various changes in the shape, size, and arrangement of parts may be resorted to without departing from the spirit of the invention or the scope of the subjoined claims.

Having thus described the invention, we claim:

1. In a device of the type described, a pair of parallel skid bars, a pair of parallel beams mounted on said bars to extend crosswise thereof, a power plant unit to be supported on said beams, said power plant unit including an engine and a variable speed transmission connected end-to-end, and a combined mounting and power output attachment for the free end of said transmission, said attachment comprising a casing secured to the transmission housing to encircle the driven shaft of the transmission, legs carried by the casing and connected at their ends to said beams, and a drive gear connected to said transmission shaft and projecting from said casing.

2. In a device of the type described, a pair of parallel skid bars, a pair of parallel beams mounted on said bars to extend crosswise thereof, a power plant unit to be supported on said beams, said power plant unit including an engine and a variable speed transmission connected end-to-end, and a combined mounting and power output attachment for the free end of said transmission, said attachment comprising a casing secured to the transmission housing to encircle the driven shaft of the transmission, legs carried by the casing and connected at their ends to said beams, an anti-friction bearing mounted in the casing, and a drive gear mounted on the transmission shaft and supported in said bearing.

3. In a device of the type described, a pair of parallel skid bars, a pair of parallel beams mounted on said bars to extend crosswise thereof, a power plant unit to be supported on said beams, said power plant unit including an engine and a variable speed transmission connected end-to-end, and a combined mounting and power output attachment for the free end of said transmission, said attachment comprising a casing secured to the transmission housing to encircle the driven shaft of the transmission, legs carried by the casing and connected at their ends to said beams, an anti-friction bearing mounted in the casing, and a drive gear mounted on the transmission shaft and supported in said bearing, said drive gear being adapted to retain the anti-friction bearing in place in the casing.

4. In a device of the type described, a pair of parallel skid bars, a power plant unit including a prime mover and a variable speed transmission connected end-to-end and adapted to be supported on said skid bars, a sprocket gear wheel connected to the transmission shaft at the power output end of the transmission, transversely extending, depending legs connected to the transmission to support the same and protect the transmission against side pull on the sprocket gear wheel, a winch drum mounted on said bars to extend in parallelism with said unit, a countershaft carried by the skid bars between the power plant unit and winch drum, and a sprocket and chain drive between the power-output end of the transmission unit and the countershaft and between the countershaft and the winch drum.

5. In a device of the type described, a power plant unit including an engine and a variable speed transmission connected end to end, and a power output attachment for the free end of said transmission, said attachment comprising a casing secured to the transmission housing to encircle the driven shaft of the transmission, supporting legs for one end of said unit carried by said casing, and a driving gear connected to said transmission shaft and projecting from said casing.

6. In a device of the type described, a power plant unit including an engine and a variable speed transmission connected end to end, and a power output attachment for the free end of said transmission, said attachment comprising a casing secured to the transmission housing to encircle the driven shaft of the transmission, supporting legs for one end of said unit carried by said casing, an anti-friction bearing mounted in the casing, and a drive gear mounted on the transmission shaft and supported in said bearing.

7. In a device of the type described, a power plant unit including an engine and a variable speed transmission connected end to end, and a power output attachment for the free end of said transmission, said attachment comprising a casing secured to the transmission housing to encircle the driven shaft of the transmission, supporting legs for one end of said unit carried by said casing, an anti-friction bearing mounted in the casing, and a drive gear mounted on the transmission shaft and supported in said bearing, said drive gear being adapted to retain the anti-friction bearing in place in the casing.

8. In a device of the type described, a variable speed transmission unit, and a power output attachment for one end of said transmission unit, said attachment comprising a casing secured to the transmission housing to encircle the driven shaft of the transmission, supporting legs for one end of said unit carried by said casing, an anti-friction bearing mounted in the casing, and a drive gear mounted on the transmission shaft to project from the casing and supported in said bearing.

9. In a device of the type described, a variable speed transmission unit, and a power output attachment for one end of said transmission unit, said attachment comprising a casing secured to the transmission housing to encircle the driven shaft of the transmission, supporting legs for one end of said unit carried by said casing, an anti-friction bearing mounted in the casing, and a drive gear mounted on the transmission shaft and supported in said bearing, said drive gear being adapted to retain the anti-friction bearing in place in the casing.

WILLIAM C. GUIER.
GERALD G. BROWN.